(12) United States Patent
Mahabadi et al.

(10) Patent No.: US 8,652,720 B2
(45) Date of Patent: Feb. 18, 2014

(54) SUPER LOW MELT TONERS

(75) Inventors: Hadi K. Mahabadi, Mississauga (CA); Ke Zhou, Oakville (CA); Michelle N. Chretien, Mississauga (CA); Edward Graham Zwartz, Mississauga (CA); Guerino G. Sacripante, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/105,305

(22) Filed: May 11, 2011

(65) Prior Publication Data

US 2012/0288789 A1    Nov. 15, 2012

(51) Int. Cl.
*G03G 9/093*     (2006.01)
(52) U.S. Cl.
USPC ............. 430/108.2; 430/108.1; 430/108.22; 430/109.1; 430/109.4; 430/109.5
(58) Field of Classification Search
USPC ........ 430/108.1, 108.2, 108.22, 109.1, 109.4, 430/109.5
See application file for complete search history.

(56) References Cited

U.S. PATENT DOCUMENTS

| | | |
|---|---|---|
| 3,590,000 A | 6/1971 | Palermiti et al. |
| 3,847,604 A | 11/1974 | Hagenbach |
| 3,985,703 A | 10/1976 | Ferry |
| 4,295,990 A | 10/1981 | Verbeek et al. |
| 4,298,672 A | 11/1981 | Lu |
| 4,338,390 A | 7/1982 | Lu |
| 4,935,326 A | 6/1990 | Creatura et al. |
| 4,937,166 A | 6/1990 | Creatura et al. |
| 5,236,629 A | 8/1993 | Mahabadi et al. |
| 5,278,020 A | 1/1994 | Grushkin et al. |
| 5,290,654 A | 3/1994 | Sacripante et al. |
| 5,302,486 A | 4/1994 | Patel et al. |
| 5,308,734 A | 5/1994 | Sacripante et al. |
| 5,330,874 A | 7/1994 | Mahabadi et al. |
| 5,344,738 A | 9/1994 | Kmiecik-Lawrynowicz et al. |
| 5,853,943 A | 12/1998 | Cheng et al. |
| 5,958,640 A | 9/1999 | Hasegawa |
| 5,959,066 A | 9/1999 | Charbonneau et al. |
| 6,025,061 A | 2/2000 | Khanarian et al. |
| 6,063,464 A | 5/2000 | Charbonneau et al. |
| 6,107,447 A | 8/2000 | Kreuder et al. |
| 6,214,507 B1 | 4/2001 | Sokol et al. |
| 6,399,713 B1 | 6/2002 | MacQueen et al. |
| 6,492,458 B1 | 12/2002 | Pavlin |
| 6,593,049 B1 | 7/2003 | Veregin et al. |
| 6,743,559 B2 | 6/2004 | Combes et al. |
| 6,756,176 B2 | 6/2004 | Stegamat et al. |
| 6,830,860 B2 | 12/2004 | Sacripante et al. |
| 7,029,817 B2 | 4/2006 | Robinson et al. |
| 7,276,614 B2 | 10/2007 | Toma et al. |
| 7,279,587 B2 | 10/2007 | Odell et al. |
| 7,329,476 B2 | 2/2008 | Sacripante et al. |
| 7,531,582 B2 | 5/2009 | Toma et al. |
| 8,197,998 B2 | 6/2012 | Zhou |
| 2003/0065084 A1 | 4/2003 | MacQueen et al. |
| 2006/0216626 A1 | 9/2006 | Sacripante et al. |
| 2006/0216628 A1 | 9/2006 | Nakamura et al. |
| 2007/0015075 A1 | 1/2007 | Vijayendran et al. |
| 2007/0077510 A1 * | 4/2007 | Nosella et al. ............. 430/109.4 |
| 2007/0088117 A1 * | 4/2007 | Zhou et al. .................... 524/539 |
| 2008/0107989 A1 | 5/2008 | Sacripante et al. |
| 2008/0107990 A1 | 5/2008 | Field et al. |
| 2008/0145775 A1 | 6/2008 | Vijayendran et al. |
| 2008/0153027 A1 | 6/2008 | Veregin et al. |
| 2008/0166648 A1 * | 7/2008 | Veregin et al. ............. 430/108.6 |
| 2008/0236446 A1 | 10/2008 | Zhou et al. |
| 2009/0047593 A1 | 2/2009 | Vanbesien |
| 2009/0155703 A1 | 6/2009 | Sacripante et al. |
| 2010/0099037 A1 * | 4/2010 | McAneney-Lannen et al. ........... 430/108.21 |
| 2010/0330486 A1 | 12/2010 | Zhou |
| 2011/0086304 A1 | 4/2011 | Asarese |
| 2011/0136056 A1 | 6/2011 | Zhou |
| 2012/0043504 A1 | 2/2012 | Yang |

FOREIGN PATENT DOCUMENTS

JP       57-023949      *  2/1982  ............... G03G 9/08

OTHER PUBLICATIONS

Translation of abstract of JP 57-023949 published Feb. 1982.*
U.S. Appl. No. 12/765,148, filed Apr. 22, 2010, Chopra, et al.

* cited by examiner

*Primary Examiner* — Peter Vajda
(74) *Attorney, Agent, or Firm* — MDIP LLC

(57) ABSTRACT

Environmentally friendly latex particles are provided which include a gelling agent and a pigment encapsulated in an amorphous resin which may be utilized in forming EA super low melt toners. Methods for providing these resins and toners are also provided.

20 Claims, No Drawings

SUPER LOW MELT TONERS

TECHNICAL FIELD

The present disclosure relates to novel toners and processes for producing same. More specifically, the present disclosure relates to toners produced by emulsion aggregation processes having super low melt performance. In embodiments, the toners of the present disclosure may be bio-based.

BACKGROUND

Numerous processes are within the purview of those skilled in the art for the preparation of toners. Emulsion aggregation (EA) is one such method. Emulsion aggregation toners may be used in forming print and/or electrophotographic images. Emulsion aggregation techniques may involve the formation of a polymer emulsion by heating a monomer and undertaking a batch or semi-continuous emulsion polymerization, as disclosed in, for example, U.S. Pat. No. 5,853,943, the disclosure of which is hereby incorporated by reference in its entirety. Emulsion aggregation/coalescing processes for the preparation of toners are illustrated in a number of patents, such as U.S. Pat. Nos. 5,290,654, 5,278,020, 5,308,734, 5,344,738, 6,593,049, 6,743,559, 6,756,176, 6,830,860, 7,029,817, and 7,329,476, and U.S. Patent Application Publication Nos. 2006/0216626, 2008/0107989, 2008/0107990, 2008/0236446, and 2009/0047593. The disclosures of each of the foregoing patents are hereby incorporated by reference in their entirety.

Polyester EA ultra low melt (ULM) toners have been prepared utilizing amorphous and crystalline polyester resins as illustrated, for example, in U.S. Patent Application Publication No. 2008/0153027, the disclosure of which is hereby incorporated by reference in its entirety.

Conventional ULM polyester based toners result in a minimum fusing temperature (MFT) reduction of about 20 degrees Celsius, which enables reduction in fuser energy and life. The reduction in MFT is primarily achieved by the introduction of a crystalline resin component in amounts from about 5 to about 10 percent. Although adding more crystalline resin (about 10 to about 20 percent) may reduce the MFT even further, its crystalline properties, i.e., conductivity, degrades electrical performance.

Further reduction of the MFT of toners, without degradation of the electrical performance of toners, together with environmentally friendly toners, remain desirable.

SUMMARY

The present disclosure provides toners and processes for producing these toners. In embodiments, a toner of the present disclosure includes at least one amorphous resin, at least one gelling agent, and optionally, one or more ingredients selected from the group consisting of amorphous resins, waxes, coagulants, pigments, and combinations thereof.

In embodiments, a toner of the present disclosure includes an emulsion aggregation toner including a core including at least one amorphous resin, at least one gelling agent, and optionally, one or more ingredients selected from the group consisting of amorphous resins, waxes, coagulants, pigments, and combinations thereof, wherein the toner has a minimum fusing temperature of from about 100° C. to about 130° C.

In embodiments, the at least one amorphous resin utilized in the toner of the present disclosure is a bio-based resin.

A process of the present disclosure may include, in embodiments, contacting at least one resin with at least one gelling agent and at least one colorant to form a resin mixture; contacting the resin mixture with de-ionized water to form a latex; recovering the latex; and contacting the latex with one or more ingredients such as amorphous resins, waxes, coagulants, pigments, and combinations thereof to form toner particles. In embodiments, the process may also include aggregating the latex and one or more ingredients to form core particles; contacting the core particles with an emulsion including at least one amorphous resin to form a shell over the particles; and coalescing the particles to form toner particles, wherein the toner has a minimum fusing temperature of from about 100° C. to about 130° C.

DETAILED DESCRIPTION

The present disclosure provides a novel toner utilizing bio-based, eco-friendly polymeric materials suitable for the formation of polyester-based EA toners. The minimum fusing temperature (MFT), also referred to as the minimum fix temperature or minimum fixing temperature, of the EA toners of the present disclosure may be reduced from about 20 degrees Celsius to about 35 degrees Celsius and have effective electrical performance. The MFT may be influenced by the fuser utilized. MFT is measured as the temperature at which acceptable levels of toner adhesion are obtained. In embodiments, MFT is the temperature to provide a toner with a gloss of about 40 Gardner Gloss Units (ggu).

Toners in accordance with the present disclosure, in embodiments, may include a core having a pigment, a gellant and a resin, encapsulated by an amorphous resin. In embodiments, the gellant is used instead of a crystalline resin, and the mechanism for achieving super low melt toners is based on the migration of the low viscosity core, leaving the shell resin on the paper surface.

In embodiments, a resin utilized to form a toner of the present disclosure may be bio-based. Bio-based resins or products, as used herein, in embodiments, include commercial and/or industrial products (other than food or feed) that may be composed, in whole or in significant part, of biological products or renewable domestic agricultural materials (including plant, animal, or marine materials) and/or forestry materials as defined by the U.S. Office of the Federal Environmental Executive.

Super low melt (SLM) toners, as used herein, in embodiments, include toners with a reduction in MFT of about 20 degrees Celsius to about 40 degrees Celsius compared with conventional EA toners. In embodiments, a SLM toner of the present disclosure may have an MFT of from about 100° C. to about 130° C., in embodiments from about 105° C. to about 125° C., in embodiments from about 110° C. to about 120° C.

Bio-Based Resins

Any toner resin may be utilized in the processes of the present disclosure. Such resins, in turn, may be made of any suitable monomer or monomers via any suitable polymerization method.

In embodiments, resins in accordance with the present disclosure may include bio-based resins. As used herein, a bio-based resin is a resin or resin formulation derived from a biological source such as vegetable oil instead of petrochemicals. As renewable polymers with low environmental impact, their principal advantages include a reduction of reliance on finite resources of petrochemicals, and they sequester carbon from the atmosphere. A bio-resin includes, in embodiments, for example, a resin wherein at least a portion of the resin is derived from a natural biological material, such as animal, plant, combinations thereof, and the like.

In embodiments, the bio-based resin may be an amorphous resin. Suitable bio-based amorphous resins include polyesters, polyamides, polyimides, polyisobutyrates, and polyolefins, combinations thereof, and the like. Examples of amorphous bio-based polymeric resins which may be utilized include polyesters derived from monomers including a fatty dimer acid or diol of soya oil, D-isosorbide, and/or amino acids such as L-tyrosine and glutamic acid as described in U.S. Pat. Nos. 5,959,066, 6,025,061, 6,063,464, and 6,107,447, and U.S. Patent Application Publication Nos. 2008/0145775 and 2007/0015075, the disclosures of each of which are hereby incorporated by reference in their entirety.

In embodiments, bio-based resins may include natural triglyceride vegetable oils (e.g. rapeseed oil, soybean oil, sunflower oil), or phenolic plant oils such as cashew nut shell liquid (CNSL), combinations thereof, and the like.

In embodiments, suitable bio-based polymeric resins which may be utilized include polyesters derived from monomers including a fatty dimer acid or diol, D-isosorbide, naphthalene dicarboxylate, a dicarboxylic acid such as, for example, azelaic acid, succinic acid, cyclohexanedioic acid, naphthalene dicarboxylic acid, isophthalic acid, terephthalic acid, glutamic acid, and combinations thereof, and optionally ethylene glycol, propylene glycol and 1,3-propanediol. Combinations of the foregoing, as well as combinations excluding some of the above monomers, may be utilized, in embodiments.

In embodiments, a suitable bio-based polymeric resin may be based on D-isosorbide, dimethyl naphthalene 2,6-dicarboxylate, cyclohexane-1,4-dicarboxylic acid, a dimer acid such as EMPOL 1061®, EMPOL 1062®, EMPOL 1012® and EMPOL 1016®, from Cognis Corp., or PRIPOL 1009®, PRIPOL 1012®, PRIPOL 1013® from Croda Ltd., a dimer diol such as SOVERMOL 908 from Cognis Corp. or PRIPOL 2033 from Croda Ltd., and combinations thereof. Suitable amorphous bio-based resins include those commercially available from Advanced Image Resources (AIR), under the trade name BIOREZ™ 13062 and BIOREZ™ 15062. Combinations of the foregoing bio-based resins may be utilized, in embodiments.

In embodiments, a suitable amorphous bio-based resin may have a glass transition temperature of from about 40° C. to about 90° C., in embodiments from about 45° C. to about 75° C., a weight average molecular weight (Mw) as measured by gel permeation chromatography (GPC) of from about 1,500 to about 100,000, in embodiments of from about 2,000 to about 90,000, a number average molecular weight (Mn) as measured by gel permeation chromatography (GPC) of from about 1,000 to about 50,000, in embodiments from about 2,000 to about 25,000, a molecular weight distribution (Mw/Mn) of from about 1 to about 20, in embodiments from about 2 to about 15, and a carbon/oxygen ratio of from about 2 to about 6, in embodiments of from about 3 to about 5. In embodiments, the combined resins utilized in the latex may have a melt viscosity from about 10 to about 100,000 Pa*S at about 130° C., in embodiments from about 50 to about 10,000 Pa*S.

The amorphous bio-based resin may be present, for example, in amounts of from about 0 to about 90 percent by weight of the toner components, in embodiments from about 20 to about 80 percent by weight of the toner components.

In embodiments, the amorphous bio-based polyester resin may have a particle size of from about 40 nm to about 800 nm in diameter, in embodiments from about 75 nm to about 225 nm in diameter.

In embodiments, the resulting bio-based amorphous resin may have an acid value, sometimes referred to herein, in embodiments, as an acid number, of less than about 30 mg KOH/g of resin, in embodiments from about 5 mg KOH/g of resin to about 30 mg KOH/g of resin, in embodiments from about 7 mg KOH/g of resin to about 25 mg KOH/g of resin. The acid containing resin may be dissolved in tetrahydrofuran solution. The acid value may be detected by titration with a KOH/methanol solution containing phenolphthalein as the indicator. The acid value (or neutralization number) is the mass of potassium hydroxide (KOH) in milligrams that is required to neutralize one gram of the resin.

The bio-based resin of the present disclosure may have a carbon to oxygen ratio (sometimes referred to herein, in embodiments, as a C/O ratio), of from about 1.5 to about 7, in embodiments from about 2 to about 6, in embodiments from about 2.5 to about 5, in embodiments from about 3.5 to about 4.7. (The carbon/oxygen ratio may be determined using a theoretical calculation derived by taking the ratio weight % of carbon to weight % of oxygen.)

In embodiments, the components (e.g., diols) utilized to make the resin may be non-petroleum based, so that the resulting polyester is derived from renewable resources, i.e., bio-based. Products can be tested for whether they are sourced from petroleum or from renewable resources by radiocarbon ($^{14}C$) dating. The current known natural abundance ratio of $^{14}C/^{12}C$ for bio-based carbon is about $1\times10^{-12}$. In contrast, fossil carbon includes no radiocarbons, as its age is much greater than the half-life of $^{14}C$ (about 5730 years). Put another way, the $^{14}C$ that would exist at the time the fossil resource was created would have changed to $^{12}C$ through a radioactive disintegration process. Thus the ratio of $^{14}C/^{12}C$ would be zero in a fossil based material. To the contrary, in embodiments, a bio-based resin produced in accordance with the present disclosure may have a $^{14}C/^{12}C$ molar ratio of from about $0.5\times10^{-12}$ to about $1\times10^{-12}$, in embodiments from about $0.6\times10^{-12}$ to about $0.95\times10^{-12}$ $^{14}C/^{12}C$ molar ratio, in embodiments from about $0.7\times10^{-12}$ to about $0.9\times10^{-12}$ $^{14}C/^{12}C$ molar ratio.

In embodiments, the resin may be formed by condensation polymerization methods. In other embodiments, the resin may be formed by emulsion polymerization methods.

Other Resins

The above bio-based resins may be used alone or may be used with any other resin suitable in forming a toner.

In embodiments, other suitable resins for forming a toner include polyester resins. Suitable polyester resins include, for example, crystalline, amorphous, combinations thereof, and the like. The polyester resins may be linear, branched, combinations thereof, and the like. Polyester resins may include, in embodiments, those resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, a resin utilized in forming a toner may include an amorphous polyester resin. In embodiments, the resin may be a polyester resin formed by reacting a diol with a diacid or diester in the presence of an optional catalyst.

Examples of organic diols selected for the preparation of amorphous resins may include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2- ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol may be present in an amount of from about 1 to about 10 mole percent of the resin.

Examples of diacid or diesters selected for the preparation of the amorphous polyester may include dicarboxylic acids or diesters selected from the group consisting of terephthalic acid, phthalic acid, isophthalic acid, fumaric acid, maleic acid, itaconic acid, succinic acid, succinic anhydride, dodecylsuccinic acid, dodecylsuccinic anhydride, dodecenylsuccinic acid, dodecenylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, dimethyl dodecenylsuccinate, and mixtures thereof. The organic diacid or diester may be present, for example, from about 45 to about 52 mole percent of the resin.

Examples of suitable polycondensation catalysts for forming the amorphous polyester resin include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

Exemplary amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), a copoly(propoxylated bisphenol A co-fumarate)-copoly(propoxylated bisphenol A co-terephthalate), a terpoly(propoxylated bisphenol A co-fumarate)-terpoly(propoxylated bisphenol A co-terephthalate)-terpoly(propoxylated bisphenol A co-dodecylsuccinate), and combinations thereof. In embodiments, the amorphous resin utilized in the core may be linear.

In embodiments, a suitable amorphous resin may include alkoxylated bisphenol A fumarate/terephthalate based polyesters and copolyester resins. In embodiments, a suitable amorphous polyester resin may be a copoly(propoxylated bisphenol A co-fumarate)-copoly(propoxylated bisphenol A co-terephthalate) resin having the following formula (I):

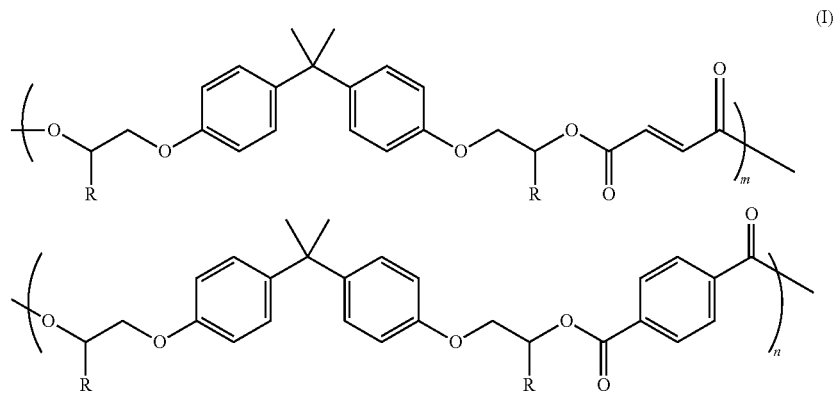

wherein R may be hydrogen or a methyl group, and m and n represent random units of the copolymer and m may be from about 2 to 10, and n may be from about 2 to 10.

An example of a linear copoly(propoxylated bisphenol A co-fumarate)-copoly(propoxylated bisphenol A co-terephthalate) which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C. and the like.

The amorphous polyester resin may be a branched resin. As used herein, the terms "branched" or "branching" includes branched resins and/or cross-linked resins. Branching agents for use in forming these branched resins include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene; combinations thereof, and the like. The branching agent amount selected is, for example, from about 0.1 to about 5 mole percent of the resin.

Linear or branched unsaturated polyesters selected for reactions include both saturated and unsaturated diacids (or anhydrides) and dihydric alcohols (glycols or diols). The resulting unsaturated polyesters are reactive (for example, crosslinkable) on two fronts: (i) unsaturation sites (double bonds) along the polyester chain, and (ii) functional groups such as carboxyl, hydroxy, and similar groups amenable to acid-base reactions. Unsaturated polyester resins may be prepared by melt polycondensation or other polymerization processes using diacids and/or anhydrides and diols.

In embodiments, a suitable amorphous resin utilized in a toner of the present disclosure may be a low molecular weight amorphous resin, sometimes referred to, in embodiments, as an oligomer, having a weight average molecular weight (Mw) of from about 500 daltons to about 10,000 daltons, in embodiments from about 1000 daltons to about 5000 daltons, in other embodiments from about 1500 daltons to about 4000 daltons.

The low molecular weight amorphous resin may possess a glass transition temperature of from about 58.5° C. to about 66° C., in embodiments from about 60° C. to about 62° C.

The low molecular weight amorphous resin may possess a softening point of from about 105° C. to about 118° C., in embodiments from about 107° C. to about 109° C.

The low molecular weight amorphous polyester resins may have an acid value of from about 8 to about 20 mg KOH/g, in embodiments from about 9 to about 16 mg KOH/g, and in embodiments from about 11 to about 15 mg KOH/g.

In other embodiments, an amorphous resin utilized in forming a toner of the present disclosure may be a high molecular weight amorphous resin. As used herein, the high molecular weight amorphous polyester resin may have, for example, a number average molecular weight ($M_n$), as measured by gel permeation chromatography (GPC) of, for example, from about 1,000 to about 10,000, in embodiments from about 2,000 to about 9,000, in embodiments from about 3,000 to about 8,000, and in embodiments from about 6,000 to about 7,000. The weight average molecular weight ($M_w$) of the resin is greater than 45,000, for example, from about 45,000 to about 150,000, in embodiments from about 50,000 to about 100,000, in embodiments from about 63,000 to about 94,000, and in embodiments from about 68,000 to about 85,000, as determined by GPC using polystyrene standard. The polydispersity index (PD) is above about 4, such as for example, in embodiments from about 4 to about 20, in embodiments from about 5 to about 10, and in embodiments from about 6 to about 8, as measured by GPC versus standard polystyrene reference resins. The PD index is the ratio of the weight-average molecular weight ($M_w$) and the number-average molecular weight ($M_n$).

The high molecular weight amorphous polyester resins, which are available from a number of sources, may possess various melting points of, for example, from about 30° C. to about 140° C., in embodiments from about 75° C. to about 130° C., in embodiments from about 100° C. to about 125° C., and in embodiments from about 115° C. to about 124° C.

High molecular weight amorphous resins may possess a glass transition temperature of from about 53° C. to about 58° C., in embodiments from about 54.5° C. to about 57° C.

The amorphous resin(s) is generally present in the toner composition in various suitable amounts, such as from about 50 to about 90 weight percent, in embodiments from about 60 to about 85 weight percent.

In further embodiments, the combined amorphous resins may have a melt viscosity of from about 10 to about 1,000,000 Pa*S at about 130° C., in embodiments from about 50 to about 100,000 Pa*S.

As noted above, in embodiments a toner of the present disclosure may include both a bio-based resin and at least one high molecular weight branched or cross-linked amorphous polyester resin. This high molecular weight amorphous resin may include, in embodiments, for example, a branched amorphous resin or amorphous polyester, a cross-linked amorphous resin or amorphous polyester, or mixtures thereof, or a non-cross-linked amorphous polyester resin that has been subjected to cross-linking. In accordance with the present disclosure, from about 1% by weight to about 100% by weight of the high molecular weight amorphous polyester resin may be branched or cross-linked, in embodiments from about 2% by weight to about 50% by weight of the higher molecular weight amorphous polyester resin may be branched or cross-linked.

As noted above, in embodiments, the resin may be formed by emulsion polymerization methods. Utilizing such methods, the resin may be present in a resin emulsion, which may then be combined with other components and additives to form a toner of the present disclosure.

Gelling Agent

In embodiments, a gelling agent, sometimes referred to herein, in embodiments, as a gellant, may be utilized in forming the toner with the processes of the present disclosure. The gellant is a material that forms a gel-like material at low temperatures but, upon heating, the hydrogen bonding in the gellant is broken and the material now flows (almost like water) because it has a very low viscosity. In embodiments, the gellant provides a sharp change in viscosity to enable low melt behavior due to a sharp phase transition. In embodiments, the gellant may be contacted with a resin, such as any of the bio-based resins described above, to form a latex emulsion.

In embodiments, suitable gellants may include polyamides. In other embodiments, the gellant may include a polymerizable epoxy resin. In embodiments, at least one of the gellants is a composite material including a polymerizable epoxy resin that is chemically functionalized with either ethylenically unsaturated groups, hydrocarbon groups, or combinations thereof, and a polyamide resin based on a polymerized fatty acid and a polyamine, and an optional reactive diluent that optionally contains unsaturated functional groups.

In embodiments, the epoxy resin component in the composite gellant may include any suitable epoxy group-containing material. In embodiments, the epoxy resin component may includes diglycidyl ethers of either polyphenol-based epoxy resins, polyol-based epoxy resins, or mixtures thereof. In embodiments, the polyphenol-based epoxy resin may be a bisphenol A-co-epichlorohydrin resin. In other embodiments, the polyol-based epoxy resin may be a dipropylene glycol-co-epichlorohydrin resin.

In embodiments, suitable epoxy resins have a weight average molecular weight of from about 200 to about 800, in embodiments from about 300 to about 700. In embodiments, suitable epoxy resins may include bisphenol-A based epoxy resins commercially available from Dow Chemical Corp., such as DER® 383, or dipropyleneglycol-based resins from Dow Chemical Corp. such as DER® 736. In embodiments, other suitable epoxy-based materials originating from natural sources may be used, such as epoxidized triglyceride fatty esters of vegetable or animal origins, for example epoxidized linseed oil, rapeseed oil and the like, and combinations thereof. Epoxy compounds derived from vegetable oils such as the VIKOFLEX® line of products commercially available from Arkema Inc. may also be used.

In embodiments, a polyamide utilized as a gellant may include a polyamide resin derived from a polymerized fatty acid such as those obtained from natural sources, including palm oil, rapeseed oil, castor oil, and the like, and combinations thereof. In embodiments, the polyamide may include a polyamide resin derived from a polymerized fatty acid such as a hydrocarbon dimer acid, prepared from dimerized C-18 unsaturated acid feedstocks such as oleic acid, linoleic acid and the like, and a polyamine, i.e., a diamine, such as for example, alkylenediamines such as ethylenediamine, DYTEK® series diamines, poly(alkyleneoxy)diamines, and the like, and copolymers of polyamides, such as polyester-polyamides and polyether-polyamides.

In embodiments, one or more polyamide resins may be used in the formation of the gellant. Commercially available sources of the polyamide resins include, for example, the VERSAMID® series of polyamides available from Cognis Corporation, such as VERSAMID® 335, VERSAMID® 338, VERSAMID® 795 and VERSAMID® 963, all of which have low molecular weights and low amine numbers; the SYLVACLEAR® polyamide resins commercially available from Arizona Chemical Co. such as SYLVACLEAR® A200, SYLVACLEAR® A200V, SYLVACLEAR A2612, SYLVACLEAR® A2614V, SYLVACLEAR® A2635, SYLVACLEAR® AF1900, SYLVACLEAR® AF1900V, SYLVACLEAR® C75V, SYLVACLEAR® IM 700, SYLVACLEAR® IM 800, SYLVACLEAR® PA 1200, SYLVACLEAR® PA 1200V, SYLVACLEAR® PE400, SYLVACLEAR® PE1800, SYLVACLEAR® PE1800V, SYLVACLEAR® WF1500, SYLVACLEAR® WF1500V; the SYLVAGEL® polyether-polyamide resins from Arizona Chemical Co. such as SYLVAGEL® 5000, SYLVAGEL® 5100; the UNICLEAR™ ester terminated polyamide resins commercially available from Arizona Chemical Co. such as UNICLEAR™ 100, and combinations thereof. The composition of the SYLVAGEL® resins is disclosed in U.S. Pat. Nos. 6,492,458 and 6,399,713 and U.S. Patent Application Publication No. 2003/0065084, the disclosures of each of which are entirely incorporated herein by reference.

In embodiments, suitable gellants include amide gellants as described in U.S. Pat. Nos. 7,531,582, 7,276,614 and 7,279,587, the entire disclosures of each of which are incorporated by reference herein. Additional gellants suitable for use include those described in U.S. patent application Ser. No. 12/765,148 to Chopra et al. filed on Apr. 22, 2010.

In embodiments, the amide gellant may be a compound of the formula

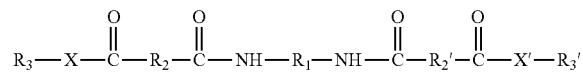

(II)

wherein:

$R_1$ is (i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like, either may or may not be present in the alkylene group) having from about 1 carbon atom to about 12 carbon atoms, such as from about 1 carbon atom to about 8 carbon atoms or from about 2 carbon atoms to about 5 carbon atoms;

(ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like, either may or may not be present in the arylene group) having from about 1 carbon atom to about 15 carbon atoms, such as from about 3 carbon atoms to about 10 carbon atoms or from about 5 carbon atoms to about 8 carbon atoms;

(iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like, either may or may not be present in either the aryl or the alkyl portion of the arylalkylene group) having from about 6 carbon atoms to about 32 carbon atoms, such as from about 7 carbon atoms to about 22 carbon atoms or from about 8 carbon atoms to about 12 carbon atoms; or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like, either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and/or alkylarylene groups can be halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are (i) alkylene groups having from about 1 carbon atom to about 54 carbon atoms, such as from about 1 carbon atom to about 48 carbon atoms or from about 3 carbon atoms to about 36 carbon atoms;

(ii) arylene groups having from about 5 carbon atoms to about 15 carbon atoms, such as from about 6 carbon atoms to about 13 carbon atoms or from about 7 carbon atoms to about 10 carbon atoms;

(iii) arylalkylene groups having from about 6 carbon atoms to about 32 carbon atoms, such as from about 7 carbon atoms to about 30 carbon atoms or from about 8 carbon atoms to about 15 carbon atoms; or (iv) alkylarylene groups having from about 6 carbon atoms to about 32 carbon atoms, such as from about 7 carbon atoms to about 22 carbon atoms or from about 8 carbon atoms to about 15 carbon atoms;

wherein the substituents on the substituted alkylene, arylene, arylalkylene, and/or alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either (a) photoinitiating groups, such as groups derived from 1-(4-(2-hydroxyethoxy)phenyl)-2-hydroxy-2-methylpropan-1-one, of the formula

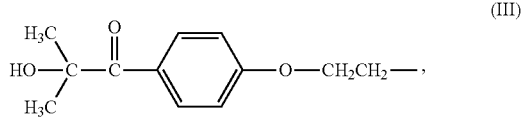
(III)

groups derived from 1-hydroxycyclohexylphenylketone, of the formula

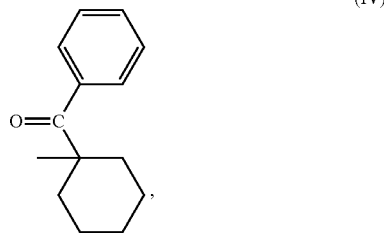
(IV)

groups derived from 2-hydroxy-2-methyl-1-phenylpropan-1-one, of the formula

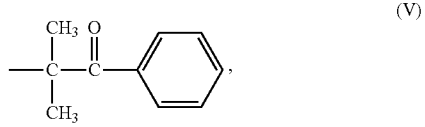
(V)

groups derived from N,N-dimethylethanolamine or N,N-dimethylethylenediamine, of the formula

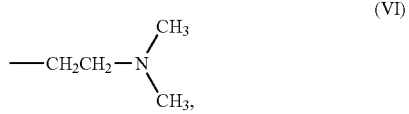
(VI)

or the like, or (b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like, either may or may not be present in the alkyl group) having from about 2 carbon atoms to about 100 carbon atoms, such as from about 3 carbon atoms to about 60 carbon atoms or from about 4 carbon atoms to about 30 carbon atoms;

(ii) an aryl group (including substituted and unsubstituted aryl groups, and wherein heteroatoms, such as oxygen, nitrogen, sulfur, silicon, phosphorus, boron, and the like, either may or may not be present in the aryl group) having from about 5 carbon atoms to about 100 carbon atoms, such as from about 6 carbon atoms to about 60 carbon atoms or from about 7 carbon atoms to about 30 carbon atoms, such as phenyl or the like;

(iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like, either may or may not be present in either the aryl or the alkyl portion of the arylalkyl group) having from about 5 carbon atoms to about 100 carbon atoms, such as from about 6 carbon atoms to about 60 carbon atoms or from about 7 carbon atoms to about 30 carbon atoms, such as benzyl or the like; or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like, either may or may not be present in either the aryl or the alkyl portion of the alkylaryl group) having from about 5 carbon atoms to about 100 carbon atoms, such as from about 6 carbon atoms to about 60 carbon atoms or from about 7 carbon atoms to about 30 carbon atoms, such as tolyl or the like;

wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring;

and X and X' each, independently of the other, is an oxygen atom or a group of the formula $-NR_4-$, wherein $R_4$ is (i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 6 carbon atoms to about 60 carbon atoms or from about 7 carbon atoms to about 30 carbon atoms;

(iii) an aryl group, including substituted and unsubstituted aryl groups, and wherein heteroatoms either may or may not be present in the aryl group, having from about 5 carbon atoms to about 100 carbon atoms, such as from about 6 carbon atoms to about 60 carbon atoms or from about 7 carbon atoms to about 30 carbon atoms;

(iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 6 carbon atoms to about 60 carbon atoms or from about 7 carbon atoms to about 30 carbon atoms; or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 6 carbon atoms to about 60 carbon atoms or from about 7 carbon atoms to about 30 carbon atoms;

wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, the entire disclosures of each of which are incorporated by reference herein, and thus are not further detailed herein.

In embodiments, the gellant may include a mixture of the following:

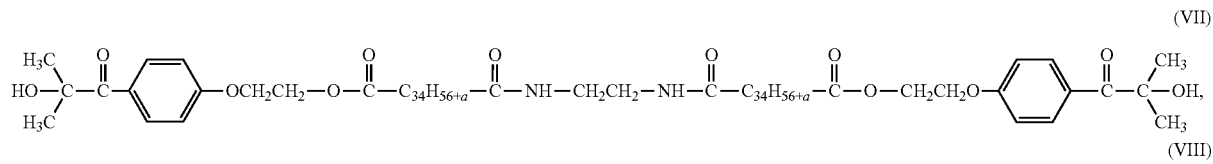

(VII)

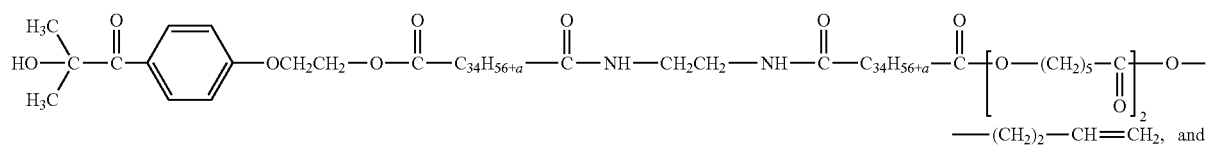

(VIII)

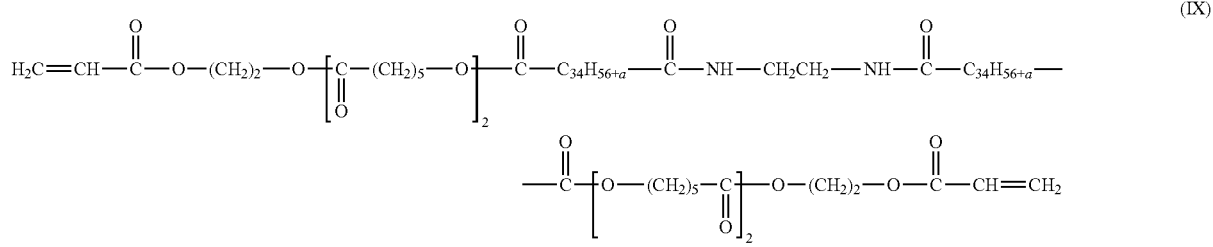

(IX)

wherein —$C_{34}H_{56+a}$— represents a branched alkylene group which may include unsaturations and cyclic groups, wherein the variable "a" is an integer from 0-12.

In embodiments, the gelling agents of the toner may be compounds as described in U.S. patent application Ser. No. 12/765,148 to Chopra et al., the entire disclosure of which is incorporated by reference herein. For example, compounds with the following general structures may be used:

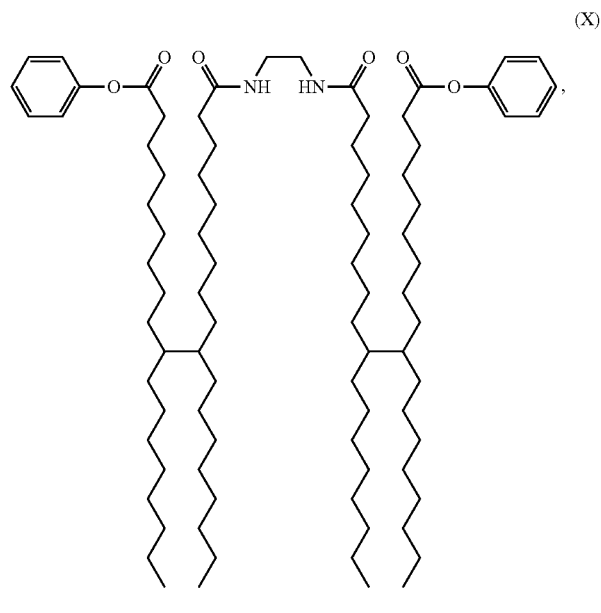

(X)

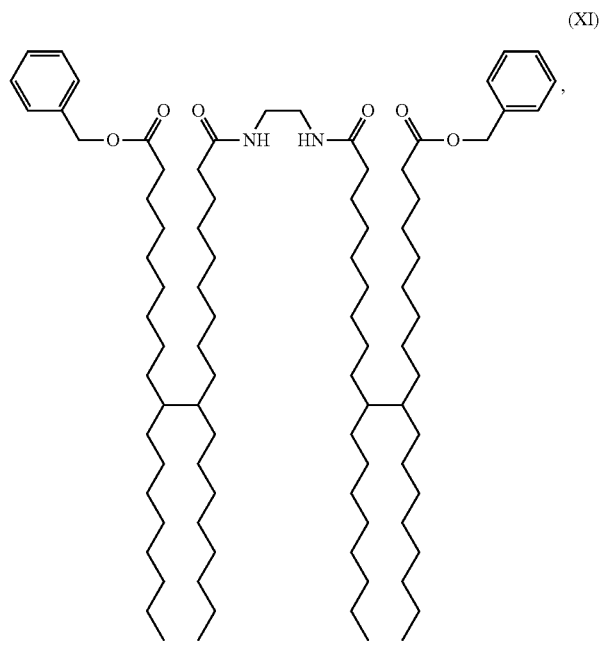

(XI)

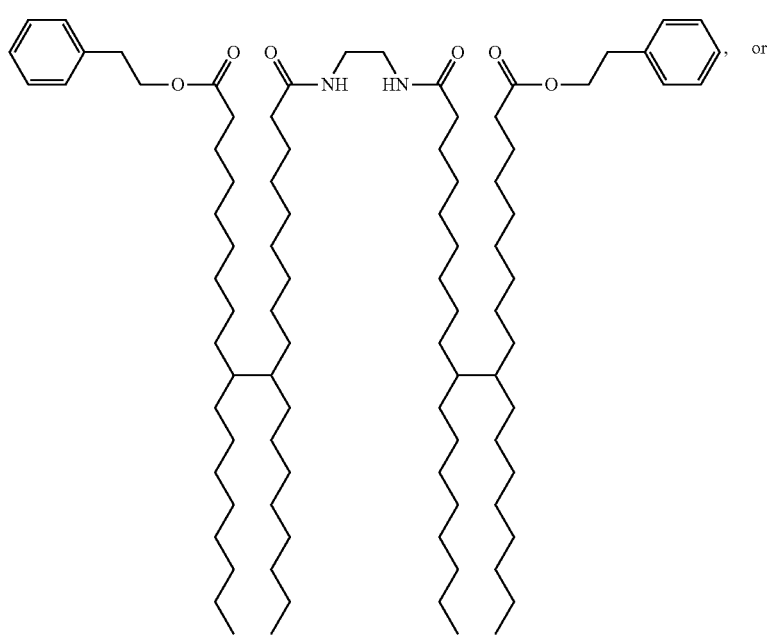
(XII)

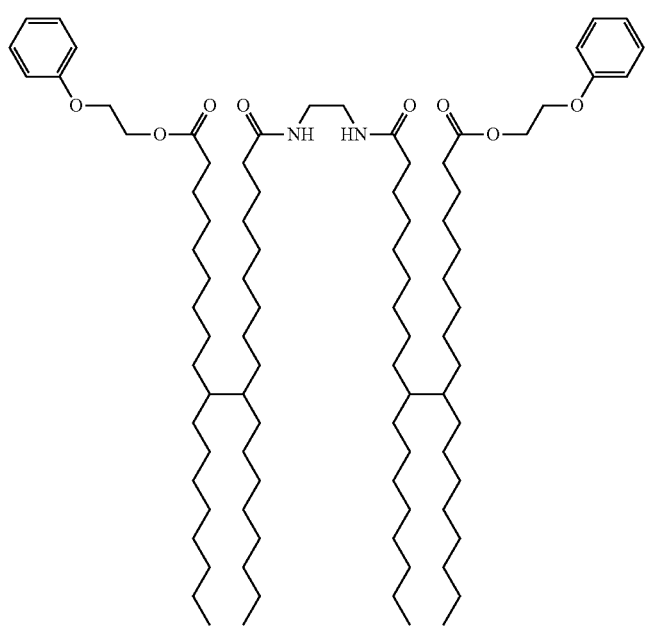
(XIII)

In embodiments, the gellant may have a number average molecular weight of from about 500 to about 100,000, in embodiments of from about 750 to about 10,000, and in other embodiments of from about 1000 to about 5000, as determined by GPC referenced with a polystyrene standard. In embodiments, the amine number of the polyamide resin utilized in forming the gellant may be from about 0 to about 10, in embodiments from about 1 to about 5.

The gellant may be present, for example, in amounts of from about 1 to about 20 percent by weight of the toner components, in embodiments from about 2 to about 10 percent by weight of the toner components.

Colorants

In embodiments, colorants may be added to the resin mixture to adjust or change the color of the resulting toner. In embodiments, colorants utilized to form toner compositions may be in dispersions. As the colorant to be added, various known suitable colorants, such as dyes, pigments, mixtures of dyes, mixtures of pigments, mixtures of dyes and pigments, and the like, may be included in the toner. The colorant may be added in amounts from about 0.1 to about 35 weight percent of the toner, in embodiments from about 1 to about 15 weight percent of the toner, in embodiments from about 3 to about 10 weight percent of the toner.

As examples of suitable colorants, mention may be made of TiO2; carbon black like REGAL 330® and NIPEX® 35; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, orange, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI-60710, CI Dispersed Red 15, diazo dye identified in the Color Index as CI-26050, CI Solvent Red 19, and the like. Illustrative examples of cyans include copper tetra(octadecyl sulfonamido) phthalocyanine, x-copper phthalocyanine pigment listed in the Color Index as CI-74160, CI Pigment Blue, Pigment Blue 15:3, Pigment Blue 15:4 and Anthrathrene Blue, identified in the Color Index as CI-69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like. Other pigments that are available from various suppliers include various pigments in the following classes identified as Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7, combinations thereof, and the like.

In embodiments, the colorant may include a pigment, a dye, combinations thereof, carbon black, magnetite, black, cyan, magenta, yellow, red, green, blue, brown, as well as combinations thereof, in an amount sufficient to impart the desired color to the toner.

Solvent

Solvents may be added in the formation of the latexes to permit the necessary reorientation of chain ends to stabilize and form particles which lead to the formation of stable latexes without surfactant. In embodiments, solvents sometimes referred to, as phase inversion agents, may be used to form the latex including the bio-based resin, pigment and gellant. These solvents may include, for example, acetone, toluene, tetrahydrofuran, methyl ethyl ketone, dichloromethane, combinations thereof, and the like.

In embodiments, the solvents may be utilized in an amount of, for example, from about 1 weight percent to about 25 weight percent of the resin, in embodiments from about 2 weight percent to about 20 weight percent of the resin, in other embodiments from about 3 weight percent to about 15 weight percent of the resin.

In embodiments, an emulsion formed in accordance with the present disclosure may also include water, in embodiments, de-ionized water (DIW), in amounts from about 30% to about 95%, in embodiments, from about 35% to about 60%, at temperatures that melt or soften the resin, from about 20° C. to about 120° C., in embodiments from about 30° C. to about 100° C.

The particle size of the emulsion may be from about 50 nm to about 300 nm, in embodiments from about 100 nm to about 220 nm.

Surfactants

In embodiments, a surfactant may be added to the resin, gellant, and optional colorant to form an emulsion.

Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a solution with a concentration from about 5% to about 100% (pure surfactant) by weight, in embodiments, from about 10% to about 95 weight percent. In embodiments, the surfactant may be utilized so that it is present in an amount from about 0.01 weight percent to about 20 weight percent of the resin, in embodiments, from about 0.1 weight percent to about 16 weight percent of the resin, in other embodiments, from about 1 weight percent to about 14 weight percent of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™, IGEPAL CA-520™, IGEPAL CA720™, IGEPAL CO-890™, IGEPAL CO720™, IGEPAL CO-290™, IGEPAL CA210™, ANTAROX 890™ and ANTAROX897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Processing

The present process includes forming a mixture at an elevated temperature containing at least one bio-based resin, a gellant, a pigment, and optionally a surfactant, to form a latex emulsion.

The resins described above may be utilized to form a latex emulsion. One, two, or more resins may be used. In embodiments, the resin may be an amorphous resin or a mixture of amorphous resins and the temperature may be above the glass transition temperature of the mixture. In embodiments, a bio-based amorphous resin may be utilized. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 4% (first resin)/96% (second resin) to about 96% (first resin)/4% (second resin).

Thus, in embodiments, a process of the present disclosure may include contacting at least one resin with a gellant and a surfactant to form a resin mixture, contacting the resin mixture with a solution of pigment, optional surfactant and water to form a phase inversed latex emulsion, distilling the latex to remove a water/solvent mixture in the distillate and producing a high quality latex.

In the phase inversion process, the resins may be dissolved in a solvent noted above, at a concentration from about 1 weight percent to about 85 weight percent resin in solvent, in embodiments from about 5 weight percent to about 60 weight percent resin in solvent.

In embodiments, the gellant and the resin may be preblended in the solvent to form a resin mixture. In other embodiments, the gellant may be added to the resin after it has been dissolved in the solvent to form a resin mixture.

The resin mixture may then be heated to a temperature of from about 25° C. to about 90° C., in embodiments from about 30° C. to about 85° C. The heating need not be held at a constant temperature, but may be varied. For example, the heating may be slowly or incrementally increased until a desired temperature is achieved.

In embodiments, a pigment, optionally in a dispersion, may be mixed together with a neutralizing agent or base solution (such as sodium bicarbonate) and optional surfactant in deionized water (DIW) to form a phase inversion solution. The resin mixture may then be contacted with the phase inversion solution to form a neutralized solution. The phase inversion solution may be contacted with the resin mixture to neutralize acid end groups on the resin, and form a uniform dispersion of resin particles through phase inversion. The solvents remain in both the resin particles and water phase at this stage. Through vacuum distillation, the solvents are stripped off.

In embodiments, the neutralizing agent or base solution which may be utilized in the process of the present disclosure includes the agents mentioned hereinabove. In embodiments, the optional surfactant utilized may be any of the surfactants mentioned hereinabove to ensure that proper resin neutralization occurs and leads to a high quality latex with low coarse content.

DIW may be added in order to form a latex emulsion with a solids content of from about 5% to about 50%, in embodiments of from about 10% to about 45%. While higher water temperatures may accelerate the dissolution process, latexes may be formed at temperatures as low as room temperature. In other embodiments, water temperatures may be from about 40° C. to about 110° C., in embodiments, from about 50° C. to about 100° C.

In embodiments, a pigment, gellant, and/or a surfactant may be added to the one or more ingredients of the resin composition before, during, or after melt-mixing. In embodiments, a pigment, gellant, and/or a surfactant may be added before, during, or after the addition of the neutralizing agent. In embodiments, a pigment, gellant, and/or surfactant may be added prior to the addition of the neutralizing agent. In embodiments, a pigment, gellant, and/or a surfactant may be added to the pre-blend mixture prior to melt mixing.

In embodiments, a continuous phase inversed emulsion may be formed. Phase inversion may be accomplished by continuing to add an aqueous alkaline solution or basic agent, optional surfactant and/or water compositions to create a phase inversed emulsion which includes a disperse phase including droplets possessing the molten ingredients of the resin composition, and a continuous phase including the surfactant and/or water composition.

Melt mixing may be conducted, in embodiments, utilizing any means within the purview of those skilled in the art. For example, melt mixing may be conducted in a glass kettle with an anchor blade impeller, an extruder, i.e. a twin screw extruder, a kneader such as a Haake mixer, a batch reactor, or any other device capable of intimately mixing viscous materials to create near homogenous mixtures.

Stirring, although not necessary, may be utilized to enhance formation of the latex. Any suitable stirring device may be utilized. In embodiments, the stirring may be at a speed from about 10 revolutions per minute (rpm) to about 5,000 rpm, in embodiments from about 20 rpm to about 2,000 rpm, in other embodiments from about 50 rpm to about 1,000 rpm. The stirring need not be at a constant speed, but may be varied. For example, as the heating of the mixture becomes more uniform, the stirring rate may be increased. In embodiments, a homogenizer (that is, a high shear device), may be utilized to form the phase inversed emulsion, but in other embodiments, the process of the present disclosure may take place without the use of a homogenizer. Where utilized, a homogenizer may operate at a rate from about 3,000 rpm to about 10,000 rpm.

Although the point of phase inversion may vary depending on the components of the emulsion, the temperature of heating, the stirring speed, and the like, phase inversion may occur when the basic neutralization agent, optional surfactant, and/or water has been added so that the resulting resin is present in an amount from about 5 weight percent to about 70 weight percent of the emulsion, in embodiments from about 20 weight percent to about 65 weight percent of the emulsion, in other embodiments from about 30 weight percent to about 60 weight percent of the emulsion.

Following phase inversion, additional surfactant, water, and/or aqueous alkaline solution may optionally be added to dilute the phase inversed emulsion, although this is not required. Following phase inversion, the phase inversed emulsion may be cooled to room temperature, for example from about 20° C. to about 25° C.

The latex emulsions of the present disclosure may then be utilized to produce particles that are suitable for emulsion aggregation super low melt processes.

The emulsified resin particles in the aqueous medium may have a submicron size, for example of about 1 μm or less, in embodiments about 500 nm or less, such as from about 10 nm to about 500 nm, in embodiments from about 50 nm to about 400 nm, in other embodiments from about 100 nm to about 300 nm, in some embodiments about 200 nm. Adjustments in particle size may be made by modifying the ratio of water to resin, the neutralization ratio, solvent concentration, and solvent composition.

The coarse content of the latex of the present disclosure may be from about 0.01 weight percent to about 5 weight percent, in embodiments, from about 0.1 weight percent to about 3 weight percent. The solids content of the latex of the present disclosure may be from about 5 weight percent to about 50 weight percent, in embodiments, from about 20 weight percent to about 40 weight percent.

In embodiments, the molecular weight of the resin emulsion particles of the present disclosure may be from about 18,000 grams/mole to about 26,000 grams/mole, in embodiments from about 21,500 grams/mole to about 25,000 grams/mole, in embodiments from about 23,000 grams/mole to about 24,000 grams/mole.

Toner

Once the resin mixture, including gellant, has been contacted with an optional colorant and water to form an emulsion, and the solvent removed from this mixture as described above, the resulting latex may then be utilized to form a toner by any method within the purview of those skilled in the art. The latex emulsion may be contacted with an optional colorant, optionally in a dispersion, and other additives, to form a super low melt toner by a suitable process, in embodiments, an emulsion aggregation and coalescence process.

Wax

Optionally, a wax may also be combined with the resin in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes may be added to provide multiple properties to the toner composition.

When included, the wax may be present in an amount of, for example, from about 1 weight percent to about 25 weight percent of the toner particles, in embodiments from about 5 weight percent to about 20 weight percent of the toner particles.

When a wax dispersion is used, the wax dispersion may include any of the various waxes conventionally used in emulsion aggregation toner compositions. Waxes that may be selected include waxes having, for example, an average molecular weight from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be from about 100 nm to about 300 nm.

Coagulants

Optionally, a coagulant may also be combined with the resin, gellant, optional colorant, and a wax in forming toner particles. Such coagulants may be incorporated into the toner particles during particle aggregation. The coagulant may be present in the toner particles, exclusive of external additives and on a dry weight basis, in an amount of, for example, from about 0 weight percent to about 5 weight percent of the toner particles, in embodiments from about 0.01 weight percent to about 3 weight percent of the toner particles.

Coagulants that may be used include, for example, an ionic coagulant, such as a cationic coagulant. Inorganic cationic coagulants include metal salts, for example, aluminum sulfate, magnesium sulfate, zinc sulfate, potassium aluminum sulfate, calcium acetate, calcium chloride, calcium nitrate, zinc acetate, zinc nitrate, aluminum chloride, combinations thereof, and the like.

Examples of organic cationic coagulants may include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, combinations thereof, and the like.

Other suitable coagulants may include, a monovalent metal coagulant, a divalent metal coagulant, a polyion coagulant, or the like. As used herein, "polyion coagulant" refers to a coagulant that is a salt or oxide, such as a metal salt or metal oxide, formed from a metal species having a valence of at least 3, in embodiments at least 4 or 5. Suitable coagulants thus may include, for example, coagulants based on aluminum salts, such as aluminum sulfate and aluminum chlorides, polyaluminum halides such as polyaluminum fluoride and polyaluminum chloride (PAC), polyaluminum silicates such as polyaluminum sulfosilicate (PASS), polyaluminum hydroxide, polyaluminum phosphate, combinations thereof, and the like.

Other suitable coagulants may also include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, combinations thereof, and the like. Where the coagulant is a polyion coagulant, the coagulants may have any desired number of polyion atoms present. For example, in embodiments, suitable polyaluminum compounds may have from about 2 to about 13, in other embodiments, from about 3 to about 8, aluminum ions present in the compound.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in, for example, U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional wax, an optional coagulant, and any other desired or required additives, and emulsions including the resins, gellants, and colorants as described above, optionally in surfactants as described above, and then coalescing the aggregate mixture. A mixture may be prepared by adding an optional colorant and optionally a wax or other materials, which may also be optionally in a dispersion(s) including a surfactant, to the emulsion, which may be a mixture of two or more emulsions containing the resin(s) and gellants. For example, emulsion/aggregation/coalescing processes for the preparation of toners are illustrated in the disclosure of the patents and publications referenced hereinabove.

The pH of the resulting mixture may be adjusted by an acid such as, for example, acetic acid, sulfuric acid, hydrochloric acid, citric acid, trifluoro acetic acid, succinic acid, salicylic acid, nitric acid or the like. In embodiments, the pH of the mixture may be adjusted to from about 2 to about 5. In embodiments, the pH is adjusted utilizing an acid in a diluted form of from about 0.5 to about 10 weight percent by weight of water, in other embodiments, of from about 0.7 to about 5 weight percent by weight of water.

Examples of bases used to increase the pH and ionize the aggregate particles, thereby providing stability and preventing the aggregates from growing in size, may include sodium hydroxide, potassium hydroxide, ammonium hydroxide, cesium hydroxide and the like, among others.

Additionally, in embodiments, the mixture may be homogenized. If the mixture is homogenized, homogenization may be accomplished by mixing at a speed of from about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof, and the like.

Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0.1 to about 10 weight percent, in embodiments from about 0.2 to about 8 weight percent, in other embodiments from about 0.5 to about 5 weight percent, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example from about 40° C. to about 90° C., in embodiments from about 45° C. to about 80° C., which may be below the glass transition temperature of the resin(s) utilized to form the toner particles.

Once the desired final size of the toner particles is achieved, the pH of the mixture may be adjusted with a base to a value from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

Shell Resin

In embodiments, after aggregation, but prior to coalescence, a shell may be applied to the aggregated particles. Any resin described above as suitable for forming the core resin may be utilized as the shell. In embodiments, an amorphous polyester resin and/or a bio-based amorphous resin as described above may be included in the shell.

In embodiments, an amorphous resin which may be utilized to form a shell includes an amorphous polyamide, optionally in combination with an additional polyester resin latex. Multiple resins may thus be utilized in any suitable amounts. In embodiments, a first bio-based amorphous resin may be present in an amount of from about 20 percent by weight to about 100 percent by weight of the total shell resin, in embodiments from about 30 percent by weight to about 90 percent by weight of the total shell resin. Thus, in embodiments, a second amorphous resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any method within the purview of those skilled in the art. In embodiments, the resins utilized to form the shell may be in an emulsion including any surfactant described above. The emulsion possessing the resins may be combined with the aggregated particles described above so that the shell forms over the aggregated particles.

The formation of the shell over the aggregated particles may occur while heating to a temperature of from about 30° C. to about 80° C., in embodiments from about 35° C. to about 70° C. The formation of the shell may take place for a period of time of from about 5 minutes to about 10 hours, in embodiments from about 10 minutes to about 5 hours.

Coalescence

Following aggregation to the desired particle size and application of any optional shell, the particles may then be coalesced to the desired final shape, the coalescence being achieved by, for example, heating the mixture to a temperature from about 45° C. to about 100° C., in embodiments from about 55° C. to about 99° C., which may be at or above the glass transition temperature of the resins utilized to form the toner particles, and/or reducing the stirring, for example to from about 100 revolutions per minute (rpm) to about 1,000 rpm, in embodiments from about 200 rpm to about 800 rpm. The fused particles may be measured for shape factor or circularity, such as with a Sysmex FPIA 2100 analyzer, until the desired shape is achieved.

Coalescence may be accomplished over a period from about 0.01 hours to about 3 hours, in embodiments from about 1 hour to about 2 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like. Such charge control agents may be applied simultaneously with the shell resin described above or after application of the shell resin.

There may also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, triboelectric charge enhancement, admix control, improved development and transfer stability, and higher toner blocking temperature. $TiO_2$ may be applied for improved relative humidity (RH) stability, triboelectric charge control and improved development and transfer stability. Zinc stearate, calcium stearate and/or magnesium stearate may optionally also be used as an external additive for providing lubricating properties, developer conductivity, triboelectric charge enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount from about 0.1 weight percent to about 5 weight percent of the toner, in embodiments from about 0.25 weight percent to about 3 weight percent of the toner. In embodiments, the toners may include, for example, from about 0.1 weight percent to about 5 weight percent titania, from about 0.1 weight percent to about 8 weight percent silica, and from about 0.1 weight percent to about 4 weight percent zinc stearate.

Suitable additives include those disclosed in U.S. Pat. Nos. 3,590,000, and 6,214,507, the disclosures of each of which are hereby incorporated by reference in their entirety. Again, these additives may be applied simultaneously with the shell resin described above or after application of the shell resin.

In embodiments, toners of the present disclosure may be utilized as super low melt toners. In embodiments, the dry toner particles having a core and/or shell may, exclusive of external surface additives, have one or more the following characteristics:

(1) Volume average diameter (also referred to as "volume average particle diameter") was measured for the toner particle volume and diameter differentials. The toner particles have a volume average diameter of from about 3 to about 25 µm, in embodiments from about 4 to about 15 µm, in other embodiments from about 5 to about 12 µm.

(2) Number Average Geometric Size Distribution (GSDn) and/or Volume Average Geometric Size Distribution (GSDv): In embodiments, the toner particles described in (1) above may have a very narrow particle size distribution with a lower number ratio GSD of from about 1.15 to about 1.38, in other embodiments, less than about 1.31. The toner particles of the present disclosure may also have a size such that the upper GSD by volume in the range of from about 1.20 to about 3.20, in other embodiments, from about 1.26 to about 3.11. Volume average particle diameter $D_{50v}$, GSDv, and GSDn may be measured by means of a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3.

(3) Shape factor of from about 105 to about 170, in embodiments, from about 110 to about 160, SF1*a. Scanning electron microscopy (SEM) may be used to determine the shape factor analysis of the toners by SEM and image analysis (IA). The average particle shapes are quantified by employing the following shape factor (SF1*a) formula: $SF1*a=100\pi d^2/(4A)$, where A is the area of the particle and d is its major axis. A perfectly circular or spherical particle has a shape factor of exactly 100. The shape factor SF1*a increases as the shape becomes more irregular or elongated in shape with a higher surface area.

(4) Circularity of from about 0.92 to about 0.99, in other embodiments, from about 0.94 to about 0.975. The instrument used to measure particle circularity may be an FPIA-2100 manufactured by Sysmex.

The characteristics of the toner particles may be determined by any suitable technique and apparatus and are not limited to the instruments and techniques indicated hereinabove.

In embodiments, the toner particles may have a weight average molecular weight (Mw) from about 17,000 to about 60,000 daltons, a number average molecular weight (Mn) of from about 9,000 to about 18,000 daltons, and a MWD (a ratio of the Mw to Mn of the toner particles, a measure of the polydispersity, or width, of the polymer) of from about 2.1 to about 10. For cyan and yellow toners, the toner particles in embodiments may exhibit a weight average molecular weight (Mw) of from about 22,000 to about 38,000 daltons, a number average molecular weight (Mn) of from about 9,000 to about 13,000 daltons, and a MWD of from about 2.2 to about 10. For black and magenta, the toner particles in embodiments may exhibit a weight average molecular weight (Mw) of from about 22,000 to about 38,000 daltons, a number average molecular weight (Mn) of from about 9,000 to about 13,000 daltons, and a MWD of from about 2.2 to about 10.

Further, the toners if desired can have a specified relationship between the molecular weight of the latex resin and the molecular weight of the toner particles obtained following the emulsion aggregation procedure. As understood in the art, the resin undergoes crosslinking during processing, and the extent of crosslinking can be controlled during the process. The relationship can best be seen with respect to the molecular peak values (Mp) for the resin which represents the highest peak of the Mw. In the present disclosure, the resin may have a molecular peak (Mp) of from about 22,000 to about 30,000 daltons, in embodiments, from about 22,500 to about 29,000 daltons. The toner particles prepared from the resin also exhibit a high molecular peak, for example, in embodiments, of from about 23,000 to about 32,000, in other embodiments, from about 23,500 to about 31,500 daltons, indicating that the molecular peak is driven by the properties of the resin rather than another component such as the wax.

Toners produced in accordance with the present disclosure may possess excellent charging characteristics when exposed to extreme relative humidity (RH) conditions. The low-humidity zone (C zone) may be about 12° C./15% RH, while the high humidity zone (A zone) may be about 28° C./85% RH. Toners of the present disclosure may possess a parent toner charge per mass ratio (Q/M) of from about −2 µC/g to about −100 µC/g, in embodiments from about −5 µC/g to about −90 µC/g, and a final toner charging after surface additive blending of from −8 µC/g to about −85 µC/g, in embodiments from about −15 µC/g to about −80 µC/g Developer The toner particles may be formulated into a developer composition. For example, the toner particles may be mixed with carrier particles to achieve a two-component developer composition. The carrier particles may be mixed with the toner particles in various suitable combinations. The toner concentration in the developer may be from about 1% to about 25% by weight of the developer, in embodiments from about 2% to about 15% by weight of the total weight of the developer (although values outside of these ranges may be used). In embodiments, the toner concentration may be from about 90% to about 98% by weight of the carrier (although values outside of these ranges may be used). However, different toner and carrier percentages may be used to achieve a developer composition with desired characteristics.

Carriers

Illustrative examples of carrier particles that may be selected for mixing with the toner composition prepared in accordance with the present disclosure include those particles that are capable of triboelectrically obtaining a charge of opposite polarity to that of the toner particles. Accordingly, in one embodiment the carrier particles may be selected so as to be of a negative polarity in order that the toner particles that are positively charged will adhere to and surround the carrier particles. Illustrative examples of such carrier particles include granular zircon, granular silicon, glass, silicon dioxide, iron, iron alloys, steel, nickel, iron ferrites, including ferrites that incorporate strontium, magnesium, manganese, copper, zinc, and the like, magnetites, and the like. Other carriers include those disclosed in U.S. Pat. Nos. 3,847,604, 4,937,166, and 4,935,326.

The selected carrier particles may be used with or without a coating. In embodiments, the carrier particles may include a core with a coating thereover which may be formed from a mixture of polymers that are not in close proximity thereto in the triboelectric series. The coating may include polyolefins, fluoropolymers, such as polyvinylidene fluoride resins, terpolymers of styrene, acrylic and methacrylic polymers such as methyl methacrylate, acrylic and methacrylic copolymers with fluoropolymers or with monoalkyl or dialkylamines, and/or silanes, such as triethoxy silane, tetrafluoroethylenes, other known coatings and the like. For example, coatings containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 weight % to about 70 weight %, in embodiments from about 40 weight % to about 60 weight % (although values outside of these ranges may be used). The coating may have a coating weight of, for example, from about 0.1 weight % to about 5% by weight of the carrier, in embodiments from about 0.5 weight % to about 2% by weight of the carrier (although values outside of these ranges may be obtained).

In embodiments, PMMA may optionally be copolymerized with any desired comonomer, so long as the resulting copolymer retains a suitable particle size. Suitable comonomers may include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 weight % to about 10 weight %, in embodiments from about 0.01 weight % to about 3 weight %, based on the weight of the coated carrier particles (although values outside of these ranges may be used), until adherence thereof to the carrier core by mechanical impaction and/or electrostatic attraction.

Various effective suitable means may be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 μm in size, in embodiments from about 50 to about 75 μm in size (although sizes outside of these ranges may be used), coated with about 0.5% to about 10% by weight, in embodiments from about 0.7% to about 5% by weight (although amounts outside of these ranges may be obtained), of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition (although concentrations outside of this range may be obtained). However, different toner and carrier percentages may be used to achieve a developer composition with desired characteristics.

Imaging

Toners of the present disclosure may be utilized in electrophotographic imaging methods, including those disclosed in, for example, U.S. Pat. No. 4,295,990, the disclosure of which is hereby incorporated by reference in its entirety. In embodiments, any known type of image development system may be used in an image developing device, including, for example, magnetic brush development, jumping single-component development, hybrid scavengeless development (HSD), and the like. These and similar development systems are within the purview of those skilled in the art.

Imaging processes include, for example, preparing an image with a xerographic device including a charging component, an imaging component, a photoconductive component, a developing component, a transfer component, and a fusing component. In embodiments, the development component may include a developer prepared by mixing a carrier with a toner composition described herein. The xerographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., in embodiments from about 80° C. to about 150° C., in other embodiments from about 90° C. to about 140° C. (although temperatures outside of these ranges may be used), after or during melting onto the image receiving substrate.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature from about 20° C. to about 25° C.

EXAMPLES

Example 1

An amorphous bio-based resin, derived from succinic acid and isosorbide, was prepared as follows. A 1-liter volume, Parr Bench Top Reactor, was fitted with a short path condenser, nitrogen inlet, and magnetic stir shaft, connected to a controller. The vessel was charged with about 292.28 grams isosorbide (IS), about 236.18 grams succinic acid (SA) and about 0.528 grams FASCAT 4201 (dibutyltin oxide). The vessel and contents were purged with nitrogen, and an aluminum block surrounding vessel was heated so that the contents of the vessel reached 150° C. over 50 minutes. By the time the temperature of the vessel reached 180° C., polycondensation of the reactant diol and diacid had begun. Approximately 44 ml of distillate was collected on Day 1. The vessel was left to heat over night at about 190° C.

On Day 2, the temperature was increased to about 220° C. and the total distillate collected reached almost 50 ml. The vacuum receiver was attached to the vacuum pump via a hose and the pressure in the reaction vessel was lowered from atmospheric pressure to about 0.09 Torr over a period of about 6 hours while collecting additional distillate. The reaction continued over the 6 hours under vacuum to increase molecular weight as checked by the softening point value measured via Dropping Point Cell (Mettler FP90 central processor with a Mettler FP83HT dropping point cell). Once the appropriate softening point was reached, the reaction was terminated by achieving atmospheric pressure again and discharging the polymer into an aluminum pan. The ground polymer was analyzed for molecular weight by gel permeation chromatography (GPC) to have a number average molecular weight of about 2,400 grams per mole, a weight average molecular weight of about 3,800 grams per mole, an onset glass transition temperature (Tg) of about 66° C., as determined by differential scanning calorimetry (DSC), and an acid value of about 14 mg per gram of KOH.

About 112.96 grams of the resin was measured into a 2-liter beaker containing about 1129.6 grams of dichloromethane. The mixture was stirred at about 300 rpm at room temperature to dissolve the resin in the dichloromethane. About 1.05 grams of sodium bicarbonate and about 4.83 grams of DOWFAX™ 2A1, an alkyldiphenyloxide disulfonate from the Dow Chemical Company (46.75 wt %), were measured into a 3-liter Pyrex glass flask reactor containing about 700 grams of deionized water. The water solution in the glass flask reactor was homogenized with an IKA ULTRA TURRAX T50 homogenizer operating at about 4,000 rpm. The resin solution was then slowly poured into the water solution as the mixture continued to be homogenized, while the homogenizer speed was increased to about 8,000 rpm and homogenization was carried out at these conditions for about 30 minutes. Upon completion of the homogenization, the glass flask reactor and its contents were placed in a heating mantle and connected to a distillation device. The mixture was stirred at about 200 rpm and the temperature of the mixture was increased to about 50° C. at about 1° C. per minute to distill off the dichloromethane from the mixture. Stirring was continued at about 50° C. for about 180 minutes followed by cooling at about 2° C. per minute to room temperature. The product was screened through a 25 μm sieve. The resulting resin emulsion included about 20.80% by weight solids in water, with an average particle size of about 199.8 nm.

Example 2

Preparation of an amide Gellant derived from PRIPOL 1009, Ethylenediamine, and 2 phenoxyethanol of the structure:

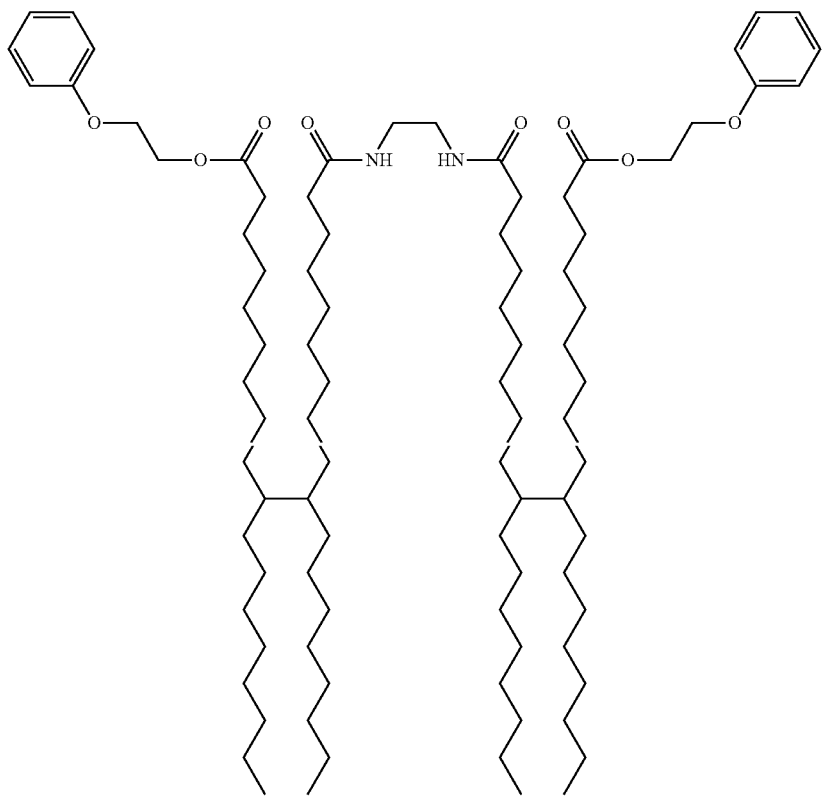 [SMILES: CCCCCCCCC(CCCCCCCCC(=O)NCCNC(=O)CCCCCCCCC(CCCCCCCC)C(CCCCCCCC)CCCCCCCCC(=O)OCCOc1ccccc1)C(CCCCCCCC)CCCCCCCCC(=O)OCCOc1ccccc1]

To a 5 gallon reactor equipped with a mechanical stirrer, about 6.55 kg of PRIPOL 1009 (a dimer acid available from Croda Corporation) was added, with about 0.014 kg of IRGAFOS 168, a triarylphosphite processing stabilizer commercially available from Ciba Specialty Chemicals. The mixture was heated to about 90° C. and mixed at about 270 rpm. Ethylenediamine (EDA) (about 0.378 kg) was charged into a 1 liter pressurizable sample cylinder and placed on a scale, and the cylinder was connected to the reactor by an inlet valve with stainless steel tubing. The EDA was charged slowly into the reactor by pressure, and the flow was controlled with a needle valve. The EDA was added over a 15 minute period at a feed rate of about 21 grams/minute. An exotherm occurred in the reactor as the EDA was added, and the reactor temperature increased to about 105° C. After all the addition of the EDA, the reactor was then heated slowly over a period of about 280 minutes to about 155° C. The reactor was then held for about 60 minutes at about 155° C. to ensure complete reaction. The reactor was then cooled to about 90° C. and toluene (about 9.48 kg) was added to dilute the product.

After the toluene addition was complete, the mixture was cooled to room temperature and 4-Di(methylamino)pyridine (DMAP) (about 0.066 kg) was added through a funnel in the top loading port of reactor. A solution of N,N'-dicyclocarbodiimide (DCC) (about 1.05 kg) and toluene (about 0.47 kg) was then slowly added into the reactor over a 30 minute period at a feed rate of about 51±5 grams/minute. An exotherm occurred, and the reactor temperature was maintained below 30° C. After the DCC/toluene had been added to the reactor, 2-phenoxyethanol (about 0.684 kg) was weighed into a 1 L stainless steel beaker and was charged into the reactor through a funnel in the top loading port and the reactor was mixed for about 4 hours at about 25° C. The synthesis reaction was complete at this point, and a solid waste byproduct (1,3-dicycloxexylurea (DCU)) was separated by filtration through 10 µm bag filters.

The reactor and bag filter system were heated to about 45° C. and the reaction slurry was discharged out of the reactor and through the filters by pressurizing the reactor. The filtrate contained the final product, and was collected in a 10 gallon portable tank. The wet cake (about 1.1 kg) was waste byproduct. The wet cake was rinsed with about 1 kg toluene, which was added to the filtrate in the portable tank. The filtrate contained the final product, was charged back into the reactor by pressure from the portable tank, and allowed to sit overnight at ambient temperature. The toluene was removed from the filtrate by vacuum distillation in the reactor to isolate the final product.

After discharge, the product was transferred into a foil tray in a lab fume hood, and it was left to cool overnight. After cooling, the final product was a sticky solid with a taffy-like consistency.

Example 3

Preparation of latex with gelling agent and pigment encapsulated in bio-based resin particles.

About 93.1 grams of 100 percent by weight of a bio-based amorphous resin of Example 1, and about 14 grams of an amide gelling agent of Example 2, was measured into a 2 liter beaker containing about 1000 grams of dichloromethane. The mixture was stirred at about 300 revolutions per minute at room temperature to dissolve the resin in the dichloromethane, thereby forming a resin solution.

About 49.37 grams of a cyan pigment dispersion (Pigment Blue 15:3) (about 17 percent by weight containing 9 parts per hundred (pph) of dodecylbenzene sulfonic acid, sodium salt, together with about 1.33 grams of sodium bicarbonate and about 3.95 grams DOWFAX™ 2A1, an alkyldiphenyloxide disulfonate (commercially available from the Dow Chemical Company) (about 47 percent by weight) was measured into a 3 liter Pyrex glass flask reactor containing about 500 grams of deionized water, thereby forming a water solution. Homogenization of the water solution in the 3 liter glass flask reactor was commenced with an IKA Ultra Turrax T50 homogenizer operating at about 4,000 revolutions per minute. The resin solution was then slowly poured into the water solution. As the mixture continued to be homogenized, the homogenizer speed was increased to about 8,000 revolutions per minute and homogenization was carried out at these conditions for about 30 minutes. Upon completion of homogenization, the glass flask reactor and its contents were placed in a heating mantle and connected to a distillation device.

The mixture was stirred at about 200 revolutions per minute and the temperature of the mixture was increased to about 50° C. at a rate of about 1° C. per minute to distill off the dichloromethane from the mixture. Stirring continued at about 50° C. for about 150 minutes, followed by cooling at about 2° C. per minute to room temperature. The product was screened through a 25 micron sieve.

The resulting resin emulsion included about 18.37 percent by weight solids in water, with an average particle size of about 220 nm.

Example 4

Preparation of EA toner.

Into a 2 Liter glass reactor equipped with an overhead stirrer, about 4.58 grams DOWFAX™ 2A1, an alkyldiphenyloxide disulfonate (commercially available from the Dow Chemical Company) (about 47 percent by weight), was combined with about 479.74 grams of the latex from Example 1, including the bio-based resin with encapsulated cyan pigment and gelling agent. The mixture was cooled to about 8° C. using an ice bath. After the pH of the components was adjusted to about 4.2 by the addition of 0.1 N nitric acid, about 59.74 grams of $Al_2(SO_4)_3$ solution (1 percent by weight) was added as a flocculent under homogenization. The temperature of the mixture was increased to about 9.5° C. with mixing at about 300 rpm. The particle size was monitored with a Coulter Counter until the core particles reached a volume average particle size of about 3.92 µm with a GSD of about 1.24.

About 120.59 grams of a 100 percent amide/bio-based resin emulsion of Example 3 (about 28.42 percent by weight) (prepared separately and without gellant or pigment) was added as a shell, resulting in core-shell structured particles with an average particle size of about 5.90 microns and a GSD of about 1.35.

The pH of the reaction slurry was then increased to about 8 using about 4.62 grams of ethylene diamine tetraacetic acid (EDTA) (about 39 percent by weight) and NaOH (about 4 percent by weight) to freeze, i.e., stop, the toner growth.

After freezing, the reaction mixture was heated to about 51° C., and the pH was about 7.2. The toner was quenched after coalescence, and it had a final particle size of about 5.83 microns and a volume average geometric size distribution (GSDv) of about 1.33.

Fusing

The toner of Example 4 was submitted for fusing evaluation. Initial fusing evaluation was carried out using a XEROX I-GEN-3 fusing fixture. Standard operating procedures were followed where unfused images of the toner of Example 4, and a control toner (1-GEN-3 cyan toner, commercially available from XEROX Corp.), were developed onto Color Xpressions+ paper (DCX+ 90 gsm) and DCEG 120 gsm paper (both commercially available from XEROX Corp.). The toner mass per unit area for the unfused images was about 0.5 mg/cm². Both the control toner as well as the toner of Example 2 were fused over a wide range of temperatures. Cold offset, gloss, crease fix, and document offset performance were measured.

Process speed of the fuser was set to 468 mm/second (nip dwell of about 34 milliseconds) and the fuser roll temperature was varied from cold offset to hot offset or up to about 210° C. for gloss and crease measurements.

Crease area measurements were carried out with an image analysis system. Print gloss as a function of fuser roll temperature was measured with a BYK Gardner 75° gloss meter.

On CX+ paper, a control toner (IGEN3 cyan toner) started to cold offset (CO) at 149° C., while the toner of Example 4 had a cold offset at 114° C.

On uncoated CX+ paper, the toner of Example 4 reached 40 gloss units (TG40) at 188° C., and the peak gloss for the toner was 54 ggu. On DCEG paper, the toner of Example 4 reached 40 gloss units (TG40) at 151° C., and the peak gloss for the toner was 40 ggu. The minimum Fix Temperature of the Toner of Example 4 was observed at 130° C., whereas the control toner had an MFT of 161° C. The hot-offset temperature of the toner of Example 4, was 180° C.

Determining the Electrostatic Charge

The following method was used to determine the electrostatic charge on the toner of Example 4. To prepare a developer, 99% of an iron powder having particle sizes of from 75 to 175 µm, with a medium particle size of 120 µm, and a spherical particle shape was accurately weighed out together with 1% of the toner, and the mixture was activated for 10 minutes on a roll mill. Thereafter, the electrostatic charge on the developer was determined. About 5 grams of the activated developer was introduced into a commercial q/m meter (from Epping GmbH, Neufahrn), including a hard blow off cell electrically connected to an electrometer. The mesh size of the sieves used in the measuring cell was 50 µm. This ensured that virtually all the toner was blown off, while the carrier remained in the measuring cell.

A fast stream of air (about 4000 cm³/min) and simultaneous aspiration was used to remove virtually all the toner from the carrier particles, the latter remaining in the measuring cell. An electrometer indicated the amount of the charge on the carrier, which corresponded to the amount of charge on the toner particles, only under the opposite sign. To calculate the q/m value, the absolute amount of q was used with the opposite sign. The measuring cell was weighed to determine the weight of blown off toner, and the weight was used to calculate the electrostatic charge q/m. The charging results (q/m) were 12 microcoulombs per gram for A-zone (28° C./85% RH) and 34 microcoulombs per gram for C-zone (10° C./15% RH).

Determining the Heat Cohesion

The following method was used to determine heat cohesion of the toner. About 5 grams of toner were placed into an open dish and conditioned in an environmental chamber at 54° C. and 50% relative humidity (RH). After 24 hours, the samples were removed and acclimated in ambient conditions for 30 minutes. The re-acclimated sample was then poured into a stack of two pre-weighed mesh sieves, which were stacked with 1,000 µm on top and 106 µm on bottom. The sieves were vibrated for 90 seconds at 1 mm amplitude with a Hosokawa flow tester. After the vibration was completed, the sieves were reweighed and the toner heat cohesion was calculated from the total amount of toner remaining on both sieves as a percentage of the starting weight. Heat cohesion of the toner of Example 4 was measured to be only 5% at 54° C. and 8% at 55° C.

Emulsions made with a gellant and a pigment encapsulated in bio-based resins also demonstrated non-degradation of the resin, and EA SLM toners were made with similar particle size, GSDv, and morphology, compared with the control toner.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A toner comprising:
   a low viscosity core particle encapsulating a pigment, wherein the core particle comprises;
   at least one bio-based amorphous resin, and
   at least one gelling agent, wherein the at least one gelling agent comprises a gelling agent having the following formula (1):

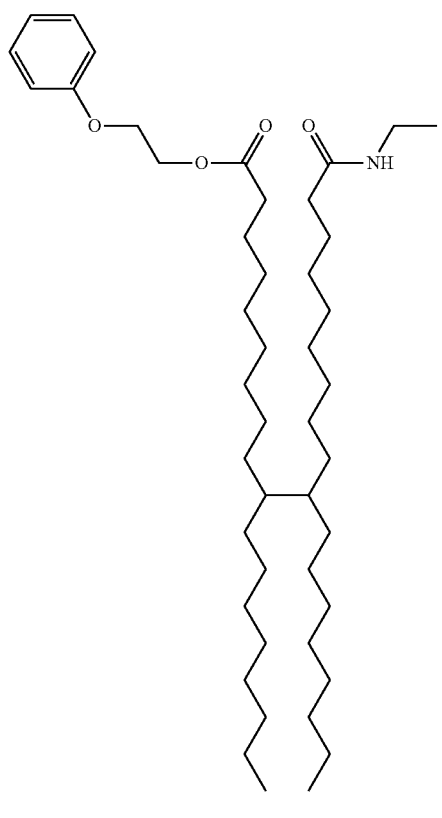

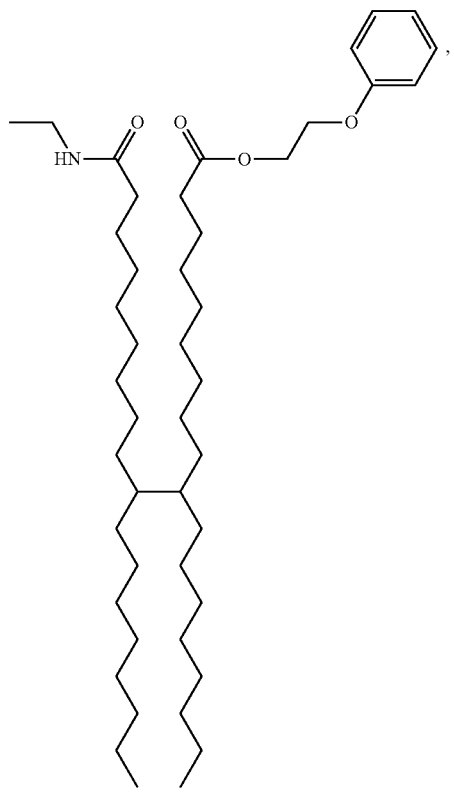

wherein the toner optionally comprises, one or more ingredients selected from the group consisting of amorphous resins, waxes, coagulants, pigments, and combinations thereof, and wherein said at least one gelling agent is used instead of a crystalline resin in the core particle.

2. The toner according to claim 1, wherein the amorphous resin is selected from the group consisting of polyesters, polyamides, polyimides, polyisobutyrates, polyolefins, and combinations thereof.

3. The toner according to claim 1, wherein the at least one gelling agent is derived from a component selected from the group consisting of amides, epoxies, and combinations thereof.

4. The toner according to claim 1, wherein the at least one gelling agent comprises an amide.

5. The toner according to claim 1, wherein the at least one gelling agent comprises an epoxy group.

6. The toner according to claim 1, wherein the toner has a minimum fusing temperature of from about 100° C. to about 130° C.

7. The toner according to claim 1, wherein the toner has a particle size of from about 3 microns to about 15 microns, and wherein the toner has a gloss of from about 30 ggu to about 80 ggu.

8. An emulsion aggregation toner comprising:
a low viscosity core particle, wherein the core particle comprises;
at least one bio-based amorphous resin, and
at least one gelling agent,
wherein the toner optionally comprises, one or more ingredients selected from the group consisting of amorphous resins, waxes, coagulants, pigments, and combinations thereof,
wherein the toner has a minimum fusing temperature of from about 100° C. to about 130° C., and wherein said at least one gelling agent is used instead of a crystalline resin in the core particle.

9. The toner according to claim 8, wherein the amorphous resin is selected from the group consisting of polyesters, polyamides, polyimides, polyisobutyrates, polyolefins, and combinations thereof.

10. The toner according to claim 8, wherein the at least one gelling agent is derived from a component selected from the group consisting of amides, epoxies, and combinations thereof.

11. The toner according to claim 8, wherein the at least one gelling agent comprises an amide.

12. The toner according to claim 8, wherein the at least one gelling agent comprises an epoxy group.

13. The toner according to claim 8, wherein the toner has a particle size of from about 3 microns to about 15 microns, and wherein the toner has a gloss of from about 30 ggu to about 80 ggu.

14. A low viscosity core toner particle comprising:
at least one bio-based amorphous resin,
at least one gelling agent, wherein the at least one gelling agent comprises a gelling agent having the following formula (1):

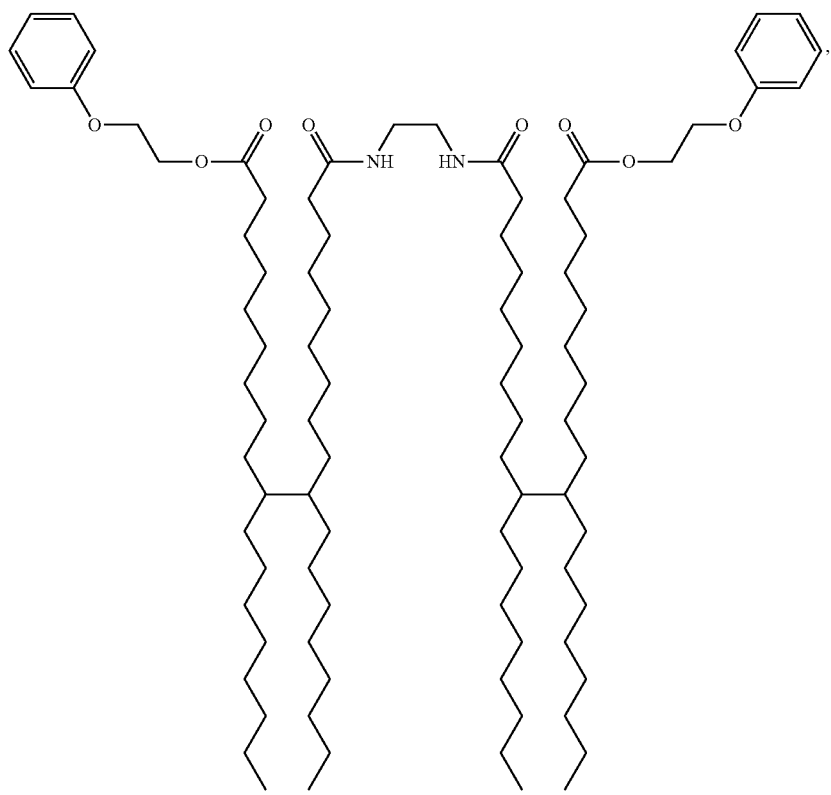 [SMILES: CCCCCCCCC(CCCCCCCCC(=O)NCCNC(=O)CCCCCCCCC(CCCCCCCC)C(CCCCCCCC)CCCCCCCCC(=O)OCCOc1ccccc1)C(CCCCCCCC)CCCCCCCCC(=O)OCCOc1ccccc1]

and wherein the at least one gelling agent is used instead of a crystalline resin in the core particle; and, a pigment encapsulated in the bio-based core particles.

15. The low viscosity core toner particle of claim 14, further comprising a shell.

16. The low viscosity core toner particle of claim 14, further comprising an amorphous resin, a wax or both.

17. The low viscosity toner particle of claim 14, wherein the at least one gelling agent is derived from a component selected from the group consisting of amides, epoxies, and combinations thereof.

18. The low viscosity core toner particle of claim 14, wherein the at least one gelling agent comprises an amide.

19. The low viscosity toner particle of claim 14, wherein the at least one gelling agent comprises an epoxy group.

20. The toner of claim 1, further comprising a shell.

* * * * *